March 13, 1962 L. PÉRAS 3,025,091
SAFETY DEVICES FOR LOCKING FROM INSIDE THE DOORS
OF AUTOMOBILE VEHICLES
Filed March 14, 1960
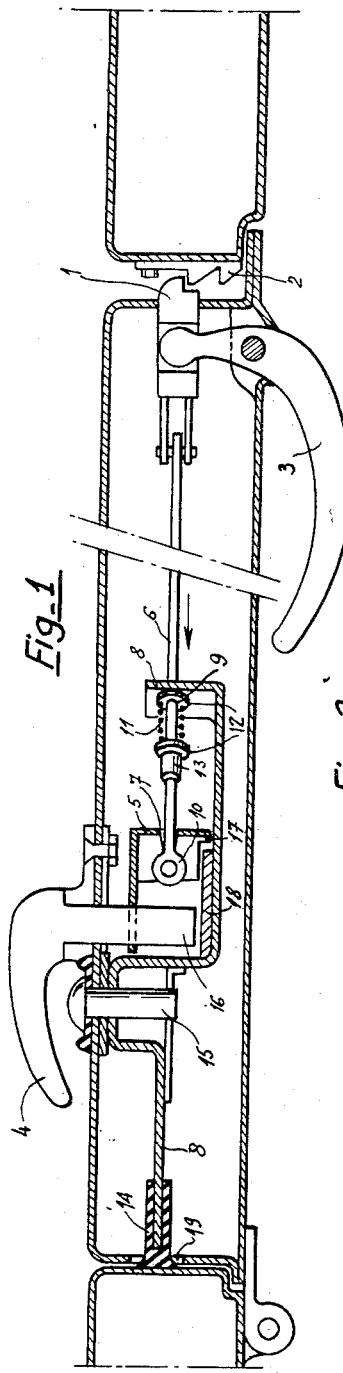
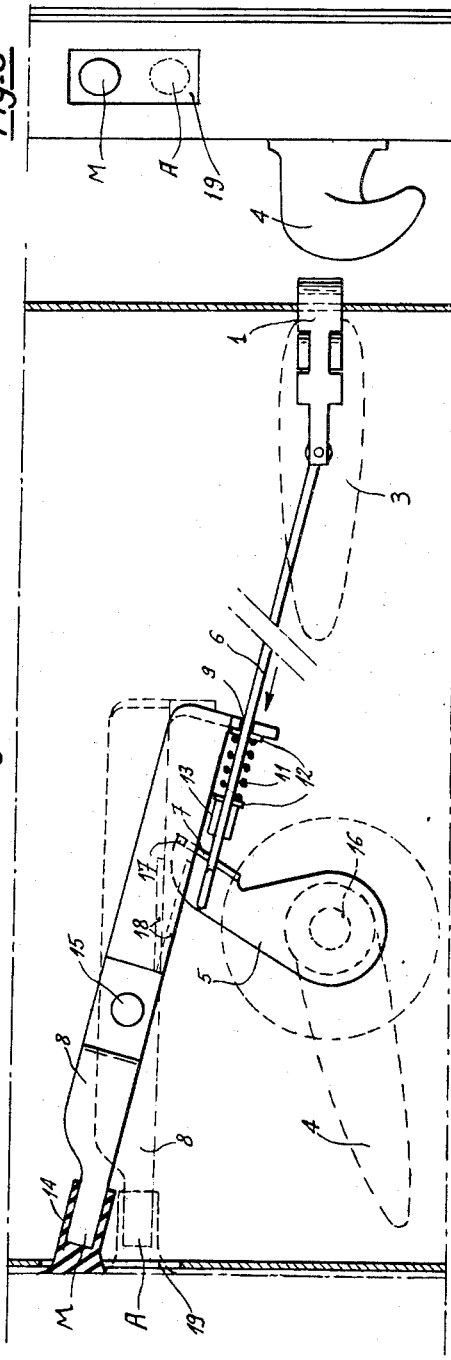
Inventor
Lucien Péras
By Stevens Davis Miller & Mosher
Attorneys

United States Patent Office 3,025,091
Patented Mar. 13, 1962

3,025,091
SAFETY DEVICES FOR LOCKING FROM INSIDE
THE DOORS OF AUTOMOBILE VEHICLES
Lucien Péras, Billancourt, France, assignor to Regie Nationale des Usines Renault, Billancourt, France, a French works
Filed Mar. 14, 1960, Ser. No. 14,879
Claims priority, application France Mar. 20, 1959
3 Claims. (Cl. 292—139)

The present invention relates to safety devices for locking from inside the doors of automobile vehicles and has for its object to provide an improved device of this character which is particularly simple and efficient, and so constructed that, for example, children cannot open the doors inopportunely.

This device is applicable to door locks of automobile vehicles which are adapted to be actuated from the outside by means of a handle and from the inside by means of a so-called counter-handle, these two control members acting independently of each other upon a same lock member the movement of which causes the opening of the door.

This invention is characterized essentially in that the kinematic linkage by which the inner counter-handle movement is transmitted to the lock bolt may be established or broken at will by simply actuating a lever controlling the lock from the outside and adapted to be set in two positions: a first "On" position in which the counter-handle normally actuates the lock; and another, "Off" position in which said linkage is disconnected or broken by causing a connecting rod to move out from its bearing position by means of a guide eye formed on the control lever, whereby no jamming of parts may occur even in case of particularly violent actuation of the inner counter-handle, and without restoring at any moment the possibility of opening the door by means of the external handle.

According to a specific arrangement provided by this invention, the safety device is controlled by a member inaccessible to the passengers of the vehicle when the doors are closed. This result is obtained preferably by disposing this control member in a portion of the door which is easily accessible when the door is open but inaccessible when the door is closed.

In order to afford a clearer understanding of this invention and of the manner in which the same may be carried out in practice, reference will now be made to the accompanying drawing forming part of this specification and illustrating diagrammatically by way of example a typical form of embodiment of a safety device constructed in accordance with the teachings of this invention. In the drawing:

FIGURE 1 is a horizontal section taken across a door having its lock provided with the safety device of this invention;

FIGURE 2 is an elevational view corresponding to FIG. 1, and

FIG. 3 is an end view of the door as seen from the hinge side.

Referring to the drawing and notably to FIG. 1, the door can be opened by releasing the bolt 1 from the keeper 2, the bolt 1 constituting a common member acted upon either by the outer handle 3 engaging for example directly this bolt 1, or by the inner or counter-handle 4 engaging the bolt 1 through the medium of a linkage adapted to be disconnected.

To this end, this linkage comprises a rod or link 6 having one end attached to the lock bolt 1 and its other, free end adapted to be anchored on a forked lever 5 rigid with the shaft 16 of counter-handle 4.

This anchorage is obtained by engaging the free end of link 6 into the notch 7 of the forked lever, in which it is retained by its end ring 10.

This engagement is controlled by the operating lever 8 pivoted on a fulcrum pin 15 and controlling the inclination of rod 6 by means of the guide eye 9. This operation is obtained manually by acting through the window 19 formed in the door frame on the hinge side upon a sucker-cup 14 carried by the free end of lever 8 and adapted, when the door is closed, to extend through the door fillister and bear against the fixed post, in order safely to hold the lever 8 in position when the vehicle is travelling.

In the "On" position as shown in M in FIGS. 2 and 3 the link 6 is so guided as to cause its engagement in the notch 7 of the forked lever 5.

In this position, when the counter-handle is operated to pull the forked lever 5 leftwards, the link is moved in the direction of the arrow, thus pulling the bolt 1 and releasing same from the keeper 2, so that the lock is open.

When the control lever 8 is pushed from the "On" position to the "Off" position, shown in A in FIGS. 2 and 3, the guide eye 9 is raised and releases the head of link 6 from notch 7.

Under these conditions, the forked lever 5 is disconnected from the rod 6 and when the counter-handle 4 is operated the bolt 1 remains in its door-closing position; therefore, the door cannot be opened from inside.

In order to prevent the link from vibrating, the latter is urged by a compression spring 11 bearing through a pair of washers 12 on the one hand against the lever 8, and on the other hand against a stop 13 rigid with the rod 6.

When it is desired to re-engage the lever 8 in its "On" position, the reverse operation must be effected manually, that is, by raising the tip 14 of lever 8 from A to M.

Then the head of rod 6 is lowered and re-engages the notch 7 of forked lever 5. To permit this engagement, it is necessary that the forked lever 5 be positioned to the right, that is, by placing the counter-handle 4 in its door-closing position, this condition, being normally obtained by the return spring usually mounted on this counter-handle. However, a passenger not conversant with this mechanism might effect a wrong operation by lowering the locking lever 8 while maintaining the counter-handle 4 in its lock-opening position.

In this case, as the lever 5 is moved to the left, the lowering of link or rod 6 will not engage same into the notch 7 and the operative connection between the counter-handle and the lock bolt would not be restored.

Various methods may be resorted to for avoiding this inconvenience. Thus, a projection 17 solid with the lever 5 and co-acting with a stop 18 solid with the control lever 8 may be used for preventing the tip 14 from moving from A to M as long as the counter-handle is in its opening position. On the other hand, when the counter-handle is in its closing position the stop 18 does not engage the projection 17 when the lever 18 moves from A to M.

In this position, the rod 6 engages the notch 7 of lever 5 and the counter-handle may be operated without any interference from the above-described safety device since the projection 17 moves above and clear of the stop 18.

When the tip 14 is in the "Off" position, it will be noted that, as the counter-handle is disconnected from the lock control linkage, any risk of jamming parts, even in case of violent operation of the counter-handle, is definitely precluded.

Moreover, the operation of the end tip 14 whereby said control linkage is connected or disconnected at will cannot take place unless the door is open, the window 19 being concealed when the door is closed, so that the device is protected against inopportune actuation by children.

Of course, various modifications and alterations may be brought to the specific form of embodiment shown and described herein, as anybody skilled in the art will readily appreciate, but these modifications and alterations would not constitute a departure from the basic principles of this invention as set forth in the appended claims.

I claim:

1. In an automotive vehicle door which includes spaced inner and outer sides, a hinged edge and an opposing free edge, an inside handle mounted on the inner side and a lock bolt slidable in an opening in the free edge; a safety device mounted between the inner and outer sides for controlling the retraction of the lock bolt by the inside handle and including a connecting rod having opposite ends, a horizontal pivot connecting one end to the lock bolt for pivotal movement of the rod about a horizontal axis, said handle having a shaft rotatably extending through the inner side and disposed transversely in the space between the inner and outer sides, a forked lever rigid with the shaft and having a notch, said connecting rod having an enlargement on its other end by means of which it can be anchored in the notch in the forked lever, an operating lever disposed in the space between the inner and outer sides of the door, means mounting the operating lever for swinging movement about a fixed horizontal axis, said operating lever having a guideway slidably receiving the connecting rod, said hinged edge of the door having an opening and said operating lever having an end disposed in the opening and extending slightly beyond the plane of the hinged edge and being disposed to be grasped and moved about its pivot axis to move the connecting rod into and out of the notch in the forked lever whereby to selectively connect the connecting rod with the inside handle, with the end of the operating lever being concealed and inaccessible when the door is closed.

2. The combination of claim 1, wherein a rubber button is provided on the end of the operating lever.

3. The combination of claim 2, wherein the forked lever is provided laterally with a projection and the operating lever is provided with a safety stop parallel to the direction of said operating lever and which, upon pivoting therewith, does not engage the projection when the inside handle is in a door-closing position, but engages it when the handle is in opening position, in such a way that movement of the button can only operate, for controlling the connection and disconnection, when the handle is in a closing position.

References Cited in the file of this patent
UNITED STATES PATENTS

| | | |
|---|---|---|
| 2,026,389 | Johnson et al. | Dec. 31, 1935 |
| 2,274,455 | Murphy | Feb. 24, 1942 |
| 2,631,878 | Backhouse | Mar. 17, 1953 |